May 8, 1962 R. P. OGDEN 3,033,552
HYDRO-PNEUMATIC SPRING UNIT
Filed Dec. 24, 1958 5 Sheets-Sheet 1

INVENTOR.
Ralph P. Ogden
BY
Mann, Brown & McWilliams
Attys.

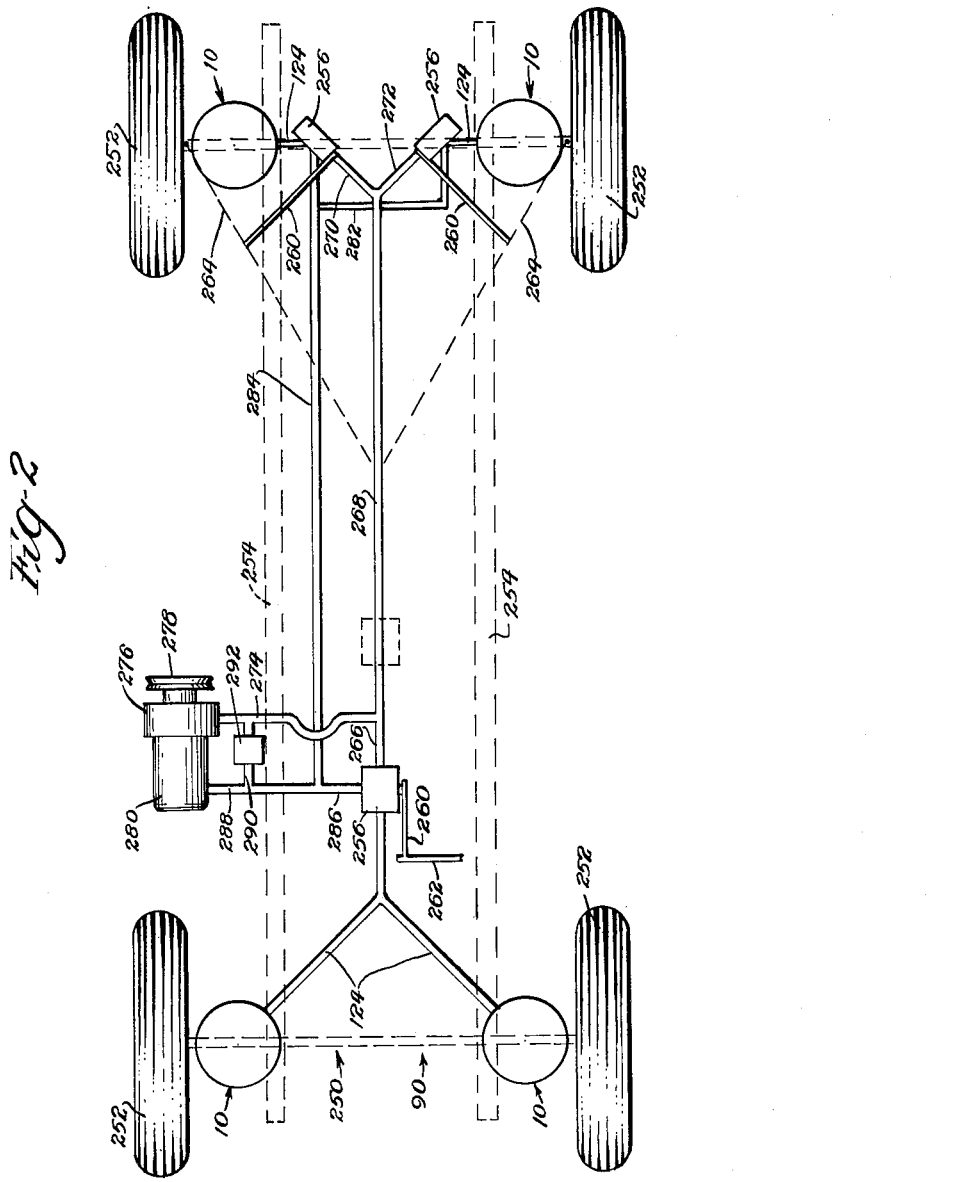

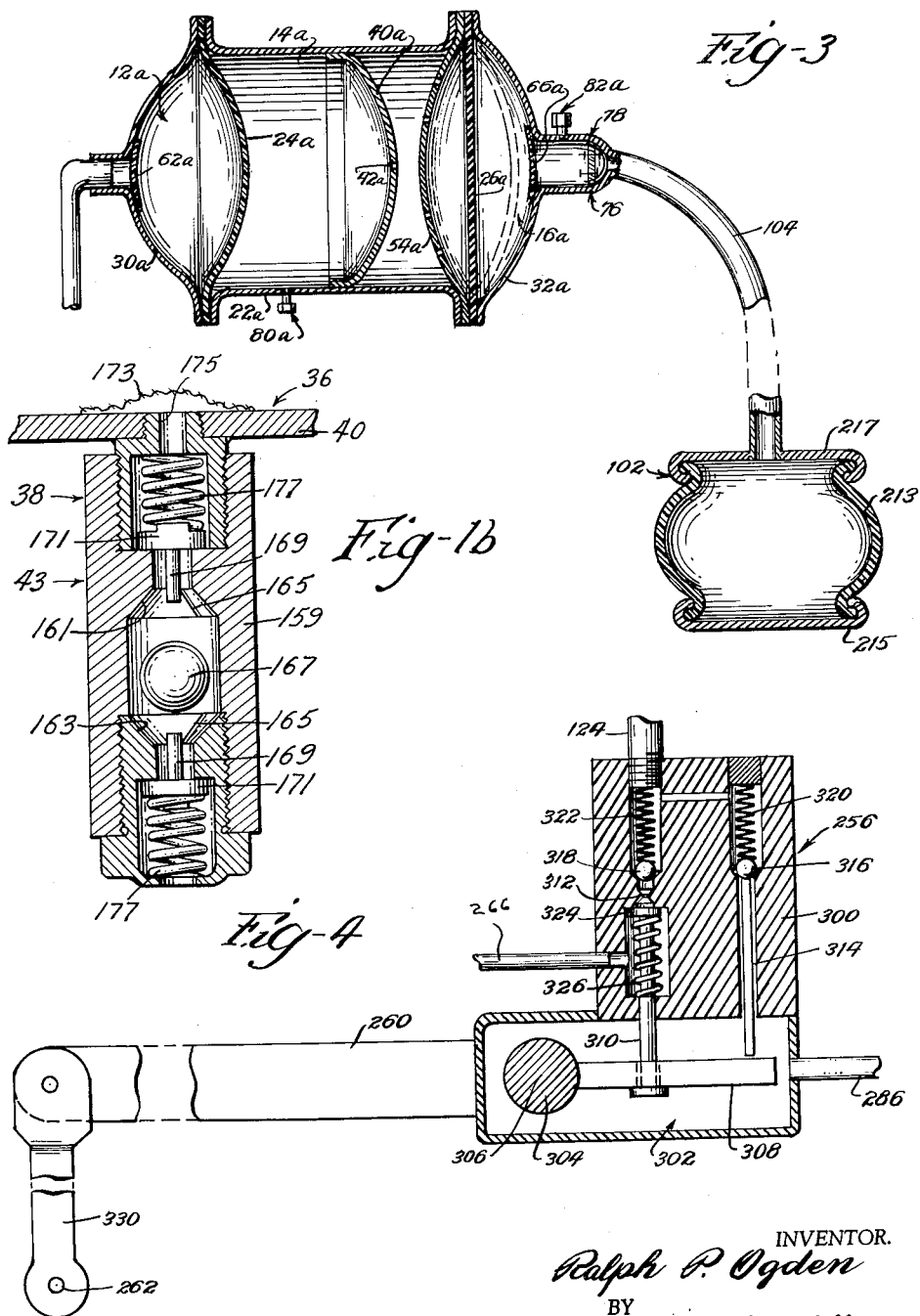

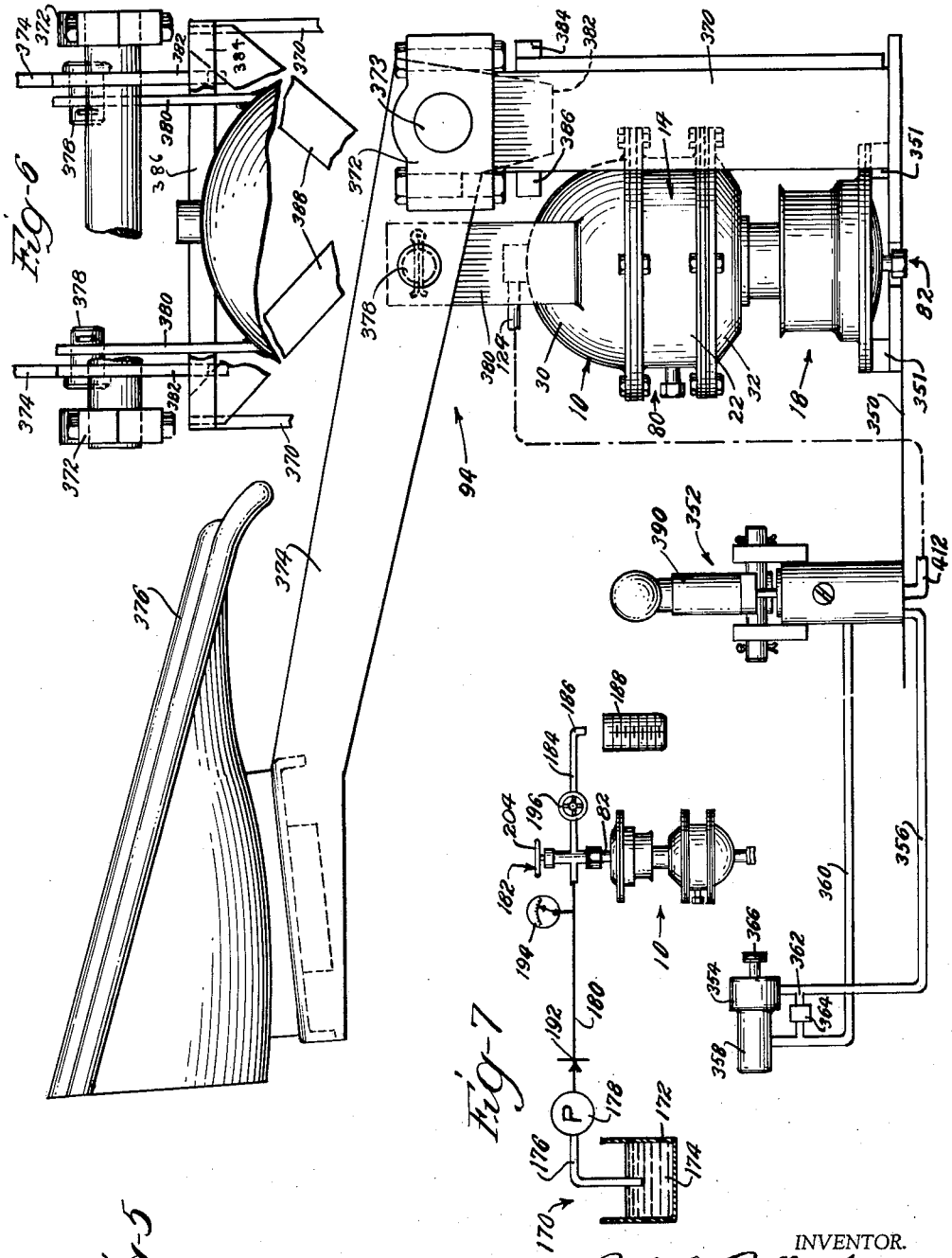

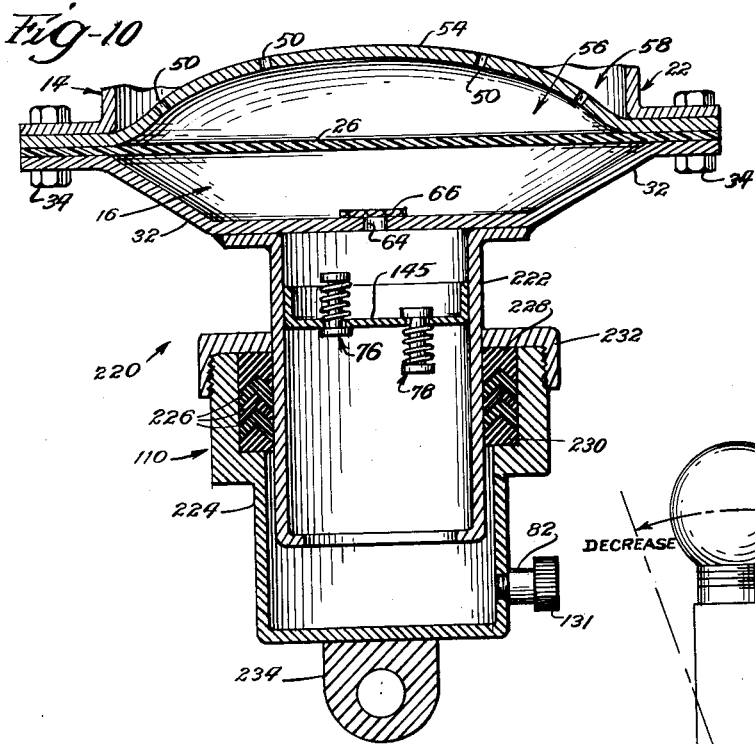

United States Patent Office 3,033,552
Patented May 8, 1962

3,033,552
HYDRO-PNEUMATIC SPRING UNIT
Ralph P. Ogden, 7522 Walnut St., Hammond, Ind.
Filed Dec. 24, 1958, Ser. No. 782,875
12 Claims. (Cl. 267—1)

My invention relates to a hydro-pneumatic spring unit that is especially adapted for use in connection with vehicular suspensions, though it has other applications. More particularly, my invention relates to a suspension device that contemplates a gas spring provided with hydraulic damping.

Until recently, automotive vehicular suspensions have consistently been largely confined to leaf and/or coil steel springs. Such springs are notoriously bulky and heavy and are not adaptable for practical adjustment to account for varying static load conditions; moreover, they require external devices for damping.

However, air springs, which use the elasticity of air for a spring, have now come into limited use. Air springs permit adjustment for changing loads, but they still require accessory damping devices or shock absorbers and are undesirably large in size.

A principal object of my invention is to provide a hydro-pneumatic spring that overcomes the shortcomings of both steel and air springs.

A further principal object of my invention is to provide a suspension unit that combines a gas spring with hydraulic damping or snubbing.

Yet another important object of the invention is to provide a spring unit which eliminates sliding seals or seals that engage sliding or moving surfaces, thereby eliminating leakage difficulties.

Still a further object of the invention is to provide a spring unit which contemplates the use of air spring structures as liquid-filled shock absorbers, the latter cooperating with a novel gas charged device to provide in one unit a gas spring with hydraulic damping that is readily adjusted to account for changes in static load, temperature, and the like.

Other objects, uses or advantages will be obvious or become apparent from a consideration of the following detailed description and the application drawings.

In the drawings:

FIGURE 1b illustrates on an enlarged scale, a further modification of the device of FIGURE 1;

FIGURE 2 is a diagrammatic plan view illustrating the unit of FIGURE 1 incorporated in a vehicular suspension system according to the principles of my invention;

FIGURE 3 is a diagrammatic plan view, partially in section, illustrating still another modification of the device shown in FIGURE 1;

FIGURE 4 is an enlarged view, partially in section, illustrating a levelling valve that may be employed in the vehicular suspension shown in FIGURE 2;

FIGURE 5 is a side elevational view of a tractor seat suspension in accordance with my invention;

FIGURE 6 is a fragmental elevational view taken from the right hand side of FIGURE 5;

FIGURE 7 is a diagrammatic view illustrating the manner in which the device of FIGURE 1 may be charged in readying same for use;

FIGURE 8 is a sectional view through the regulating valve of the suspension of FIGURE 5, illustrating its principal components;

FIGURE 9 is a sectional view through a valve fitting employed in the arrangement of FIGURE 7; and FIGURE 10 is a longitudinal sectional view illustrating the principles of my invention applied to a piston-type hydraulic shock absorbing device.

General Description

Figures 1, 1A:
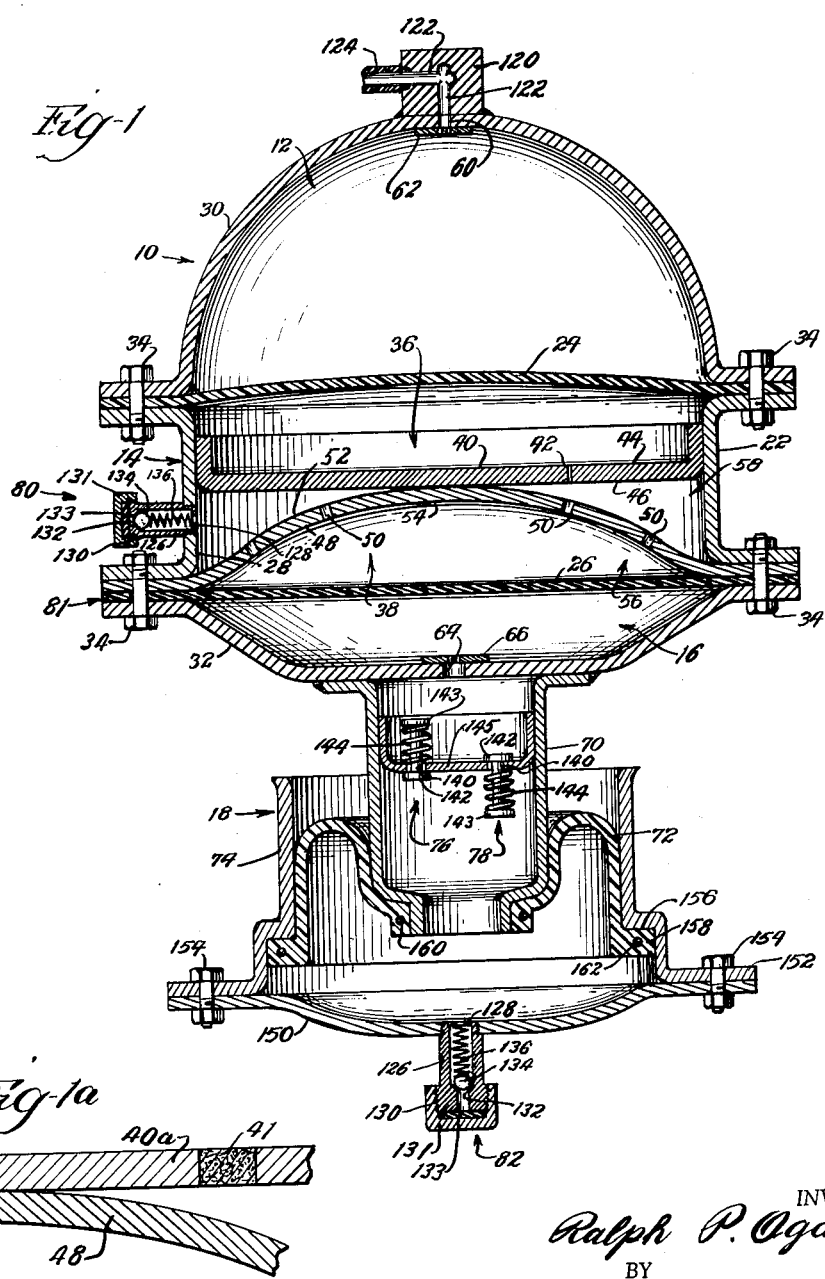
FIGURE 1 is a longitudinal sectional view through a preferred embodiment of a spring unit arranged in accordance with the principles of my invention.
FIGURE 1a is a fragmental sectional view illustrating a modification of the device of FIGURE 1.

Referring now more particularly to FIGURE 1, reference numeral 10 generally indicates a preferred spring unit arrangement in accordance with the principles of my invention. Spring unit 10 comprises a hydraulic spring levelling chamber 12, a two-compartment captive gas or spring chamber 14, and a hydraulic damping chamber 16 that is closely associated with hydraulic damping cell 18.

The two-compartment gas spring chamber 14 is defined by rigid tubular member 22 and resilient diaphragms 24 and 26 that are positioned across the bore 28 of tubular member 22. In the illustrated arrangement, the respective diaphragms 24 and 26 are clamped to the ends of the tubular member 22 by dished rigid members 30 and 32, respectively, that are drawn up against the tubular member 22 by appropriate bolts 34.

Thus, the levelling chamber 12 is defined by diaphragm 24 and dished member 30, while the chamber 16 is defined by diaphragm 26 and dished member 32.

In accordance with my invention, the spring chamber 14 is formed into gas reservoir compartment 36 and gas spring compartment 38. In the embodiment illustrated, this is done by fixing plate or disc 40 within the bore of tubular member 22 in any suitable manner, as by welding. Plate or disc 40 is provided with an orifice 42 of capillary dimensions (as, for instance, having a diameter on the order of .002 to .006 inch), or alternatively, is made relatively thick and is provided with a plug 41 of sintered metal (see FIGURE 1a) or other suitable substance, that is sufficiently porous to provide limited communication between the sides 44 and 46 of disc 40. Furthermore, a suitable valve 43 (see FIGURE 1b) may be employed instead of orifice 42 or plug 41.

The embodiment of FIGURE 1 also contemplates the use of dished back stop plate 48, which in the illustrated arrangement is fixed in the gas spring compartment 38 side of tubular member 22 by the bolts 34 at that end of this member (a suitable gasket (not shown) being interposed between tubular member 22 and plate 48). The dished member 48 is formed with a sufficient number of relatively large orifices 50 to permit unrestricted passage of air between the sides 52 and 54 thereof so that in effect, the spaces 56 and 58 on either side of the member 48 comprise a single gas compartment 38.

The hydraulic levelling chamber 12 is placed in communication with an appropriate source of hydraulic liquid under pressure (depending on the use to which unit 10 is put) which is admitted thereto through port 60 formed in dished member 30 which may be covered by screen plate 62 formed with sufficient openings to readily admit the hydraulic liquid.

The hydraulic damping chamber 16 is placed in communication with hydraulic cushion cell 18 by orifice 64 formed in dished member 32; orifice 64 may be covered by a suitable screen plate 66 that is similar to plate 62.

The cushion cell 18 in the embodiment of FIGURE 1 is of the rolling diaphragm type including pedestal member 70 which in effect defines part of the damping chamber 16, rolling diaphragm member 72, and tubular retaining member 74.

The pedestal member 70 is provided with damping valves 76 and 78 to restrict the flow of hydraulic fluid between chamber 16 and the hydraulic cushion cell.

The gas cushion chamber 14 is preferably charged with gas through appropriate valve 80, while the hydraulic chamber 16 and hydraulic cushion cell 18 are charged with hydraulic liquid through appropriate valve 82. In accordance with my invention, the gas charge in the chamber 14 and the hydraulic liquid charge in the chamber 16 and cushion cell 18 are "captive" charges in that they are sealed against escape.

In operation, chambers 12, 14, 16 and cushion cell 18 are charged with sufficient quantities of the respective fluids indicated to adapt the spring to support a predetermined static load at a predetermined level or elevation. The device is then placed between a load that is to be supported and its supporting framework, which respectively bear against the dished housing member 30 and the opposite end of the device, which in the embodiment of FIGURE 1 is represented by plate 150 of tubular diaphragm securing member 74 of cushion cell 18.

When the charges in chambers 12, 14, 16 and the cushion cell are properly proportioned, the diaphragm 26 will be positioned approximately as shown when a predetermined static load will be supported at its predetermined height. When the load increases, the composite spring structure 81 formed by dished member 30, tubular member 22, dished member 32, and pedestal 70 will move downwardly (in the showing of FIGURE 1) with respect to tubular diaphragm supporting member 74. This will cause a downward rolling action of the diaphragm 72, which will decrease the volume that the hydraulic liquid in the cushion cell can occupy, with the result that a consequently increased pressure will open damping valve 78 to permit hydraulic liquid to move into chamber 16 through orifice 64. The increased volume of hydraulic liquid in chamber 16 deflects diaphragm 26 upwardly (in the showing of FIGURE 1) against the compressed gas in chamber 14 to further compress same.

The increased static load may be restored to its predetermined height position by forcing additional hydraulic liquid into the chamber 12 by means of a suitable pump. The pumping action continues until the diaphragm member 26 is restored to the position of FIGURE 1. During this pumping action, the increase in quantity of hydraulic liquid in chamber 12 deflects diaphragm 24 downwardly against the captive gas in chamber 14, which compresses it to the point that diaphragm 26 will be restored to its position of FIGURE 1 against the increased pressure that has been applied to chamber 16; this restores the cell 16 to its initial position by forcing sufficient hydraulic liquid through valve 76 to raise the pedestal and the structure it carries to the initial or predetermined position.

When the static load is decreased, the pressure of the gas in chamber 14 causes hydraulic liquid in chamber 16 to pass through valve 76 and into cushion cell 18, which tends to move pedestal 70 and the members carried by it upwardly (in the showing of FIGURE 1) of the tubular diaphragm connecting member 74. Diaphragm 26 will then be deflected downwardly by the pressure of the gas in chamber 14.

The load is returned to its desired position by pumping sufficient hydraulic liquid from chamber 12 to restore the diaphragm 26 to its initial position; as hydraulic liquid is pumped from chamber 12, the pressure in chamber 12 is reduced, which permits the captive gas charge of chamber 14 to deflect the diaphragm 24 upwardly. At the same time, diaphragm 26 moves back to the position of FIGURE 1, hydraulic liquid being forced by the weight still supported to flow through valve 78 and into chamber 16, whereby the load is lowered back down to its desired elevation, which is achieved when the diaphragm 26 is positioned as shown in FIGURE 1.

It will be appreciated that the unit 10 may be used upright as it is shown in FIGURE 1, or reversed, the operation being substantially the same. The device may also be used when horizontally disposed or, for that matter, in any desired position. Regardless of how the unit 10 is mounted, suitable provision can be made for operating and protecting valves 80 and 82.

FIGURE 2 of the drawings illustrates my spring unit incorporated in a vehicular suspension system generally indicated at 90. The spring units are generally indicated by reference numeral 10 in FIGURE 2.

In the embodiment of FIGURE 5, my spring unit is shown incorporated in a tractor seat suspension 94, the spring unit being indicated by reference numeral 10 in FIGURE 5.

The spring unit shown in FIGURE 3 is substantially identical to that shown in FIGURE 1 except that the cushion cell 102 is separated from the remainder of the unit and connected to the chamber 16a by a conduit 104. Cell 102 is of the bellows type, though it is charged with hydraulic liquid, together with chamber 16 and conduit 104, instead of air as is customary with devices of the bellows type illustrated.

The embodiment of FIGURE 10 comprises a piston-type hydraulic cushion cell 110, the remainder of the structure being identical to that shown in FIGURE 1.

*Specific Description*

Referring again to the embodiment of FIGURE 1, the dished members 30 and 32, tubular member 22, disc 40, and dished member 48 may be formed from any suitable material such as steel. Spring chamber 14 is charged with a moisture-free gas such as nitrogen, while chambers 12 and 16, and cushion cell 18 are charged with an appropriate grade of low-pour point mineral oil, such as the type used in conventional hydraulic shock absorbers. Diaphragms 24 and 26 may be formed from any suitable resilient material, such as neoprene rubber or its equivalent or other materials that will be resistant to attack by the specific hydraulic liquid employed.

Dished members 30 and 32 may be of any appropriate shape though it is desirable that they be outwardly dished and curved for strengthening purposes. They may be flat plates if suitably braced and formed or mounted to provide the volume desired for chambers 12 and 16; the term "dished members" as employed in the claims is intended to include such an arrangement. Screen plate 66 of plate 32 may be eliminated and bore 64 widened to the diameter of pedestal 70 without affecting the function of the spring, but the illustrated arrangement makes for convenience in charging and protects the diaphragm 26 against accidents.

In the embodiment of FIGURE 1, the dished member 30 is provided with a block-like fitting 120 formed with passages 122 to which conduit 124 (that feeds to a source of hydraulic liquid) is suitably connected. However, other suitable fittings may be employed as may seem necessary or desirable.

The valves 80 and 82 may be of any suitable type, though in their illustrated forms they each include a sleeve 126 carrying a tubular screw-threaded stud 128 at one end thereof (which is turned into place on the unit), and a screw-threaded head portion 130 at the other end thereof which is perforated as at 132 to admit the fluid being charged into the unit 10. An appropriate type of check valve is preferably associated with each valve 80 and 82, such as ball 134 biased against the opening 132 by an appropriate compression spring 136 acting between the ball and threaded stud 128. Head portion 130 may receive an appropriate cap 131 (see FIGURES 5 and 10) provided with seal 133 to close off the respective valves.

Screen plates 62 and 66 may be of any suitable type, though their perforations should be sufficiently large and numerous to freely pass the hydraulic liquid. They are provided to prevent the respective diaphragms from being drawn through the respective passages or perforations 60 and 64 under adverse pressure conditions.

The valves 76 and 78 each comprise a stem 140 having heads 142 and 143 at each end thereof. The respective stems 140 are biased to their positions of FIGURE 1 by appropriate compression springs 144 interposed between the respective heads 143 and the plate member 145 that they extend through. Plate member 145 is fixed in any suitable manner within pedestal structure 70. The damping action provided by these valves may be varied by varying the compressive forces applied by springs 144.

The heads 142 of the respective stems 140 are lifted off their seats by pressure acting on their stem or inner sides (when the necessary pressure differential exists).

The cushion cell 18 includes base plate 150 bolted to flange 152 of tubular diaphragm retaining device 74 as by appropriate bolts 154. Of course, a hydraulic seal should be effected between plate 150 and flange 152.

Tubular diaphragm retaining device 74 is formed with an internal shoulder 156 that is engaged by the external shoulder 158 of diaphragm 72. The other end of the diaphragm 72 is given a shape generally complementary to the pedestal 70. Diaphragm 72 may be provided with reinforcing bands or wires 160 and 162 if so desired.

The two-compartment gas chamber 14 is of particular significance. As mentioned hereinbefore, the disc 40 divides this chamber into reservoir compartment 36 and spring compartment 38. The orifice 42 must be of capillary dimensions to restrict gas flow between compartments 36 and 38 and its equivalent, plug 41, must provide a similar restricted gas flow. The gas flow permitted by orifice 42, plug 41 or valve 43 should be sufficiently gradual so that when the unit 10 is taking a series of rapid jolts, the springing action is provided by the air that is in compartment 38 without significant loss of air through orifice 42 (or plug 41).

Valve 43 comprises a body 159 (see FIGURE 1b) secured in plate 40 and positioned in compartment 38. Body 43 is formed with valve seats 161 and 163 each provided with a groove 165 of capillary dimensions; ball 167 when forced against either seat 161 or 163 permits only a slow flow of gas through the seat groove 165 until the pressure equalizes in both the compartments 36 and 38. Rapid build up of pressure in either compartment 36 or 38, as on bouncing, causes a fast air flow which forces the ball 167 against an unseating stem 169 of T-shaped members 171 and acts primarily as a check valve, said slow gas flow in the meantime passing through the adjacent grooves 165. Screen plate 173 may be provided over opening 175 of valve 43, and compression springs 177 act on members 171.

It may be mentioned that when hydro-pneumatic device 10 is functioning as a spring, the restriction 42, plug 41 or valve 43 are of necessity not completely effective in blocking or preventing flow of gas between compartments 36 and 38. These are sufficiently effective for the purposes of the invention, however, for the reason that a complete spring cycle requires very little time, about .92 second, for the spring shown in FIGURE 1 when used, for instance, as in FIGURE 5 as a tractor seat suspension. A cycle includes movement, for instance, of composite part 81 down from static position, up past static position and then back down to static position. During this cycle, the pressure will be the same in compartment 38 as in compartment 36 at the start of the cycle at static position, increasing in compartment 38 as the spring structure 81 travels downwardly, decreasing in compartment 38 as composite structure 81 travels upwardly and equalizing with that in compartment 36 when it goes by the static position (and decreasing as it continues upwardly of static height). As composite structure 81 start downward again, the pressure in compartment 38 again increases until at static height it again is equal to the pressure in compartment 36. The pressure in compartment 38 is thus greater than in compartment 36 for half the cycle and less for half the cycle. The pressure differential, which determines the amount of gas transferred through orifice 42, builds up from zero (at static height) to an amount depending upon the deflection from static height, the volume of spring compartment 38, the effective area supporting the load, and the pressure of the gas in compartment 38 at static height or position.

For instance, it will require about 293 p.s.i.g in unit 10 to support a 200 pound man at static height on the seat suspension 94. The pressure would build up in compartment 38 in a downward deflection of ½ inch, to 405 p.s.i.g. An upward deflection of ½ inch would decrease the pressure in compartment 38 to 211 p.s.i.g. There is a relatively small amount of time at such pressure differentials for passage of gas between compartments 38 and 36, so that actually an unimportant amount is transferred during a spring cycle. While it is possible to mount time delay check valves between compartments 36 and 38, substituting for the orifice 42 the plug 41 or valve 43, the design complications so introduced would not appear to warrant the small improvement thereby resulting.

In view of the fact that the unit 10 is designed to support a static load at a standard height, which means that at such standard or predetermined height the diaphragm 26 will be in a predetermined position, for instance, the position of FIGURE 1, the compartment 38 forms a gas compartment of predetermined volume which is maintained effectively constant during the operation of the device, as when the vehicle of FIGURE 2 is in motion, the compartment 36 forming a storage space for gas that must be added to or removed from chamber 38 to dispose the diaphragm at its predetermined position. As the unit 10 is adapted to be levelled to a predetermined elevation or height, the springing action provided by unit 10 when supporting a load at such predetermined height or elevation will be uniform regardless of the load imposed upon it. Excess gas passes through orifice 42 (or plug 41 or valve 43) if the load is increased above or is reduced below the predetermined amount. The same action occurs on increases or decreases in temperature.

The embodiments of FIGURES 1, 1a and 1b provide orifices of capillary dimensions and the language employed in the appended claims is intended to cover the structure of these figures and their equivalents.

It will be appreciated that the unit 10 must be charged in such a manner that the diaphragm 26 will be at the desired position when the unit is under a predetermined static load and thus will hold, for instance, the body of the vehicle shown in FIGURE 2 at a predetermined elevation. Furthermore, some manner of recharging in the field or at the service stations to replace fluid lost from slow leaks is desirable. The arrangement of FIGURE 7 has been provided for this purpose, though it is to be understood that other apparatus and methods may be employed as may seem necessary or desirable by those skilled in the art.

The apparatus of FIGURE 7 generally comprises an appropriate tank or reservoir 172 containing hydraulic liquid 174, a conduit 176 leading to an appropriate pump 178, a conduit 180 of any appropriate type connecting pump 178 and a charging valve fitting 182 that is adapted for connection with hydraulic charging valve 82, and an appropriate conduit 184 terminating in a nozzle or spout 186 from which hydraulic liquid may flow into a graduated container 188 of any suitable type.

Conduit 180 should be provided with a check valve 192 of any conventional type and a pressure gauge 194; conduit 184 should be provided with an appropriate type of off-on valve 196.

As indicated in FIGURE 9, the valve fitting 182 is provided with a tubular stud 200 carrying collar 201 adapted to screw-threadedly engage thread head 130 of a valve 82. Tubular stud 200 screw-threadedly carries plunger 202 provided with handle 204 for turning same against ball 134 to lift same off its seat. Fitting 182 may be provided with an appropriate packing seal 206 about plunger 202 which is pressed into sealing relation therewith by cap 208 turned against packing gland 210. Seal 203 may be interposed between the end of stud 200 and head 130 of valve 82.

In operation, the apparatus 170 is employed as follows: First of all, the gas chamber 14 is charged through valve 80 with an appropriate gas to about one-half of the required final charging pressure. Then the charging valve fitting 182 is applied to the valve 82 (after unit 10 is turned upside down) substantially as shown in FIGURE 9, or in any other suitable manner, and off-on valve 196 moved to the off position. The plunger 202 is then operated to move ball 134 off its seat and pump 178 is started to pump hydraulic liquid from reservoir 172 into the chamber 16 and its associated cushion cell 18. When the space within cushion cell 18 and chamber 16 has been filled with hydraulic liquid, continued operation of pump 178 will deflect diaphragm 26 upwardly (in the showing of FIGURE 1) until it is forced into contact with back stop plate 48. At this point, the pressure gauge 194 will show a sudden rise in pressure, at which time the pump 178 should be stopped.

Off-on valve 196 is then opened slowly to permit hydraulic fluid to leave spout 186. The flow from nozzle 186 will for a time contain air bubbles, and as soon as a steady stream of liquid without bubbles emerges from nozzle 186, valve 196 should be closed; if the liquid flow stops before the stream is free of bubbles, the valve 196 should be closed and the previously mentioned steps repeated.

With the valve 196 again closed, the liquid in container 188 should be returned to reservoir 172, after which the container is then returned to the position of FIGURE 7. The pump 178 should again be operated until the pressure gauge 194 again shows the sudden rise in pressure at which time the pump should be stopped. Valve 196 is then opened to permit a predetermined amount of liquid to flow into the graduated container as determined by the graduations of the container. Valve 196 should then be closed and valve fitting 182 removed.

The predetermined amount of liquid returned to the container will be that amount necessary to restore the diaphragm 26 to the position of FIGURE 1, or any other desired standard position.

The chamber 16 and cushion cell 18 of the unit are now charged with a measured amount of hydraulic liquid, and the gas charge is then completed to the desired predetermined pressure.

The above procedure may be followed whether or not levelling chamber 12 has a charge; it preferably is given at least a partial predetermined charge to keep the stress on diaphragm 24 at a minimum. This charge may be applied to chamber 12 in any suitable manner.

On recharging of chamber 16 and cell 18 at service stations or the like in the field, apparatus such as that indicated at 170 in FIGURE 7 may be employed to add hydraulic liquid until the pressure gauge 194 indicates the sudden rise in pressure at which time the pump 178 is stopped. Valve 196 is then opened to permit the discharge of a predetermined amount of hydraulic liquid necessary to restore diaphragm 26 to its predetermined standard position.

When a gas recharge is desired, the hydraulic liquid should be drained from the chamber 16 and then the gas and liquid charging procedure originally mentioned above should be repeated.

The unit of FIGURE 3 is functionally the same as that of FIGURE 1 and includes chambers 12a, 14a and 16a that are formed from structures essentially the same as described in connection with the embodiment of FIGURE 1. Like reference numerals are employed to indicate similar parts in FIGURE 3 (as well as the other figures) though the suffix "a" has been employed to distinguish the two embodiments of the invention. The somewhat different shapes involved in the showing of FIGURE 3 have no material effect on the operation of the device. As already mentioned, the load is supported by the cushioned cell 102 rather than the spring unit as a whole, cell 102 comprising bellows member 213 (formed from a suitable oil-resistant resilient material such as neoprene) secured at its ends in any suitable manner to end plates 215 and 217, which the load and its support actually engage.

It may also be mentioned that, if desired, the two compartments of chambers 14 or 14a may be remote from each other and connected by a conduit that includes orifice means of capillary dimensions.

The unit 220 of FIGURE 10 differs from that of FIGURE 1 by the use of the piston-type cushion unit 110. Thus, the unit 220 includes chamber 16 of the embodiment of FIGURE 1, the dished member 32 thereof fixedly carrying piston-forming member 222. The piston-forming member 222 is slidably engaged by suitable packing elements 226 that in the illustrated embodiment are V-shaped in cross-sectional configuration and which are compressed between packing rings 228 and 230 by retainer 232 screw-threadedly engaging the cylinder-forming member 224.

The cylinder-forming member 224 should be provided with a pierced lug 234 or any other suitable structure that permits this member to be pivotally mounted, as well as a valve 82 for charging purposes.

The device 220 operates in substantially the same manner as the device 10 through the sealing action carried by the cushioned cell is not as effective as cushion cells 18.

Referring now to FIGURE 2, the suspension system 90 for the vehicle 250 includes four units 10 mounted between the respective wheels 252 of the vehicle and the chassis that ordinarily includes longitudinally extending frame members 254 that carry the vehicle body (not shown). The units 10 may be associated between the wheels and the frame structure in any conventional manner, such as now used for the conventional air springs. The conduits 124 lead to levelling valves 256 of the type diagrammatically illustrated in FIGURE 4. In the showing of FIGURE 2, a single levelling valve 256 is provided at the front of the car while two levelling valves 256 are provided at the rear of the car. The levelling valves may be secured, for instance, to a vehicle body between the vehicle body and the ground engaging wheels in any suitable manner, they each including an actuating arm 260 which in the case of the forward levelling valve 252 is connected to a stabilizer bar 262 while in the case of the two rear levelling valves 256, is connected to an axle strut rod 264, these conventional automotive components being shown only diagrammatically.

The levelling valves 256 are connected by hydraulic liquid supplying conduits 266, 268, 270, 272 and 274 to an appropriate type of hydraulic pump 276 that is carried by the automobile and actuated by the automobile motor, as by a pulley belt engaging appropriate pulley 278.

The pump 276 draws hydraulic liquid from an appropriate reservoir 280 to supply it to the respective chambers 12 when needed, as dictated by the positioning of the levelling valves 256.

Return conduits 282, 284, 286 and 288 return hydraulic liquid from the respective levelling valves to reservoir 280 when this action is dictated by the respective levelling valves.

A bypass conduit 290 including check valve 292 of any appropriate type interconnects the supply and return conduits 274 and 288 so that during normal operation of the vehicle at its predetermined elevation, the pump 276 may continuously operate to return hydraulic liquid to reservoir.

The specific levelling valve 256 shown in FIGURE 4 generally comprises a body portion 300 carrying a closed chamber 302 in which stub shaft 304 is journalled in any suitable manner to pivot about axis 306. Stub shaft 304 is fixed to arm 260 and within chamber 302 carries projection 308.

On clockwise movement of stub shaft 304, pin 310 is moved downwardly of FIGURE 4 to open orifice 312 to admit hydraulic liquid from pump 276 to conduit 124 of the associated spring unit 10.

On counterclockwise movement of stub shaft 304, projection 308 engages pin 314 to displace ball 316 from its seat and permit return of hydraulic liquid from the associated unit 10 to, for instance, a return conduit 286.

Balls 316 and 318 are held in their illustrated positions by appropriate compression springs 320 and 322 while the head 324 of pin 310 is held against orifice 312 by appropriate compression spring 326.

The levelling valve shown in FIGURE 4 is intended to be the forward levelling valve 256 of FIGURE 2, link 330 being connected to stabilizer rod 262.

The specific levelling valve employed is not critical although the specific valve shown in FIGURE 4 has the important feature of the ball checks sealing off the fluid under pressure, thereby permitting very little loss of liquid when the vehicle is not in operation. Being pressure sealed, there is no dependence on close tolerances to prevent leakage from chamber 12 of the associated unit 10.

Normally the levelling or height control valves 256 are designed so that there is a "dead band" of operation about plus or minus one-quarter of an inch from the normal or designed height within which there is to be no flow to or from the spring unit 10. The valves 256 are automatic in operation and are provided for the purpose of directing additional hydraulic liquid to the respective spring units when the vehicle is below the normal or design height, and to bleed off liquid from the spring units when the vehicle is above the normal or design height. Such conditions prevail mainly when the vehicle is jouncing or rebounding when absorbing irregularities of the highway, upon a change or load as when passengers are entering or leaving the vehicle, or when luggage is added or removed, upon temperature changes, which would change the pressure of the gas in the spring unit, thus requiring compensation, and when the vehicle is going around a curve where centrifugal force places additional weight on the outside wheels.

The actual size of the specific units 10 as employed in the front and rear of the vehicle will be determined by conventional considerations of vertical distance to be travelled and weight to be supported. The hydraulic system shown in FIGURE 2 may also include a conventional accumulator device to store up hydraulic liquid under pressure against a gas for use under conditions of heavy demand for adjustment, as where several passengers enter the vehicle. Accumulators are common components of hydraulic systems so no specific illustration is believed necessary.

The seat suspension 94 of FIGURE 5 may be employed for tractor seats or seats of other vehicles or apparatus wherein a passenger or operator is to be supported against jounce and rebound. The unit 10 is mounted in any suitable manner on the vehicle floor 350 (as by resting on blocks 351) and the hydraulic liquid is supplied to or removed from the chamber 12 by a hydraulic system similar to that shown in FIGURE 2, but including regulator valve 352 in place of the levelling valves 256. A suitable pump 354 actuated by the vehicle motor supplies hydraulic liquid under pressure to supply conduit 356 which is connected to regulating valve 352; hydraulic liquid is returned from the valve 352 to reservoir 358 by appropriate return conduit 360. Supply conduit 356 and return conduit 360 may be connected by appropriate bypass conduit 362 including check valve 364 to permit continuous operation of motor 354, which may be operated by an appropriate pulley belt engaging pulley 366.

Adjacent cushion unit 10 of seat suspension 94, a pair of spaced supports 370 are secured in any suitable manner to the tops of which are respectively mounted appropriate bearings 372 which journal shaft 373 that fixedly carries spaced seat support bars or members 374 to which the tractor seat 376 is secured in any suitable manner.

Each member 374 carries a headed pin 378 to which is pivotally connected a depending support bar 380 that is fixed as by welding to the dished member 30 of the unit 10.

The seat supporting members 374 include angled projections or extensions 382 which project between stop bars 384 and 386 that define the maximum and minimum compression of the unit 10. Supports 370 may be reinforced by appropriate braces 388 or in any suitable manner.

The unit 10 is initially charged as described above and then applied in the position shown in FIGURE 5. When the rider climbs into seat 376, he operates the regulating valve 352 to raise or lower the seat to the predetermined elevation that provides the predetermined resiliency desired regardless of the operator's particular weight.

As indicated in FIGURE 8, when operating arm 390 is swung to the right of FIGURE 8, projection 392 which is fixed to operating arm 390 goes downwardly to engage pin 394 and move ball 396 from its seat within the valve body 398. Hydraulic liquid then will flow from supply conduit 356 through passages 400, 402, 404, past ball check valve 406 and through passages 408 and 410 to conduit 412 that corresponds to conduit 124 of FIGURE 1 and extends between valve 352 and the unit 10.

On movement of the handle 390 to the left of FIGURE 8, projection 414, which is fixed to handle 390, contacts pin 416 which throws ball 418 off of its seat and permits hydraulic liquid to return from unit 10 through conduit 412, passages 410, 420, 422, 424 and thence to return conduit 360 and reservoir 358.

Balls 396, 406 and 418 are pressed against their respective seats by appropriate compression springs 426, plugs 428 closing the chambers 430 in which the respective balls 406 and 418 are disposed.

Pins 394 and 416 are each provided with an annular flange 432 which respectively rest on shoulders 434 of caps 438. The respective pins are sealed against leakage by appropriate O-ring seals 436 positioned in caps 438.

It may be added that the modified spring units shown in FIGURES 3 and 10 may be substituted for the specific units shown in FIGURES 2 and 5. And alternatively, unit 10 may be positioned to the right of shaft 373 by extending supporting members 374 and inverting unit 10 for application against a suitable abutment above supporting members 374, without altering the leverage obtained.

The spring unit 10 as employed in seat suspension 94 is designed to operate at a static pressure on the order of 147 p.s.i.g. for a 100 pound person up to pressures on the order of 441 p.s.i.g. for a 300 pound person. At static conditions, the pressure will be the same in all the spring unit chambers, but when absorbing vertical movement, pressure differentials will occur that will equalize when static conditions return. When the composite spring structure 81 moves downwardly or toward cushion cell member 74, the pressure of the liquid below plate 145 will be greater than above it, and when the composite structure 81 moves away from cell member 74, the pressure of the hydraulic liquid above plate 145 will be greater than that below, both conditions being created by the presence of damping valves 76 and 78. The pressure in chamber 12 and reservoir chamber 36 are equal at all times, as are the pressures of the gas in spring chamber 38 and the liquid above damping valves 76 and 78.

The spring units when employed in suspension system 90 are designed for operating pressures corresponding to the loads they will carry.

Generally speaking, units 10 are designed for operation under static pressures ranging from 50–1000 p.s.i. depending on the load to be carried. The units have a vibration rate in the range of 35–85 vibrations per minute, which is well under that normally encountered when vehicles hit bumps or the like. Because of the relatively high pressures involved, there will be little change in vibrating characteristics of a particular unit 10 between its maximum and minimum static pressures.

Advantages of Invention

It will thus be seen that I have provided a spring unit with hydraulic damping that is compact and leakage-free. I have found that substantially higher pressures can be employed in my unit than when using air alone as in the conventional air spring devices. Parts thus may be smaller, cheaper and easier to mount.

Since the gas is sealed into the spring system, there is no problem of moisture, dirt, corrosion or other oxidation involved such as is encountered with the use of air compressed from the atmosphere. Thus, metal parts can be made of steel.

The spring units herein disclosed have the dual functions of absorbing and damping shock. Without damping, the load carried by the spring would oscillate up and down for numerous cycles, after a shock, before coming to rest. In the arrangement of FIGURE 5, the spring unit serves as a "frequency changer" in that it converts the higher vibration rates applied to a vehicle to slower and less objectionable ones. It is a peculiarity of the human body that slower vibrations with greater amplitude cause much less distress than more rapid vibrations at shorter amplitude, and my invention provides such low vibration rates with maximum amplitude.

The two-compartment gas chamber permits the spring to operate at a virtually constant frequency throughout its load carrying range as variations that might be caused by load changes and temperature changes are compensated for. This is to be distinguished from conventional units employing a captive gas in a single chamber since these units have a frequency that is inherently dependent upon the load and the temperature; thus, for instance, temperature decreases and load increases increase the frequency of vibration by decreasing the volume that the gas can occupy.

Hydraulic pumps adapted for use in connection with this invention, as compared to air compressors necessary for the conventional air springs, are much smaller, more efficient, cheaper and more maintenance-free. Furthermore, many contemporary vehicles now have hydraulic pumps (for operating steering, brakes and other accessories), that may be used in practicing my invention. Hydraulic control valves are smaller and easier to maintain in a leak-proof condition than gas valves.

The units herein disclosed can be mounted in any position, which is to be distinguished from known conventional gas and liquid spring units. This is because the gas and liquid chambers are sealed from each other.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A hydro-pneumatic spring unit comprising a first chamber charged with gas under pressure, said chamber comprising a rigid tubular member having spaced resilient diaphragms fixed across the bore thereof to define said chamber, a partition mounted in said chamber and extending across said bore, said partition being formed with orifice means of capillary dimensions, a second chamber associated with one end of said tubular member and defined in part by one of said diaphragms, a third chamber associated with the other end of said tubular member and defined in part by the other of said diaphragms, said second and third chamber being charged with hydraulic liquid, one of said last mentioned chambers being adapted for communication with a hydraulic cushion cell, and means for damping hydraulic flow between said one of said last mentioned chambers and said cushion cell.

2. A hydro-pneumatic spring unit comprising a first chamber charged with gas under pressure, said chamber comprising a rigid tubular member having spaced resilient diaphragms fixed across the bore thereof to define said chamber, a partition mounted in said chamber and extending across said bore, said partition being formed with orifice means of capillary dimensions, a second chamber associated with one end of said tubular member and defined in part by one of said diaphragms, a third chamber associated with the other end of said tubular member and defined in part by the other of said diaphragms, said second and third chambers being charged with hydraulic liquid under pressure, a hydraulic cushion cell in communication with one of said last mentioned chambers, and means for damping hydraulic flow between said one of said last mentioned chambers and said cushion cell.

3. A hydro-pneumatic spring unit comprising a first chamber charged with gas under pressure, said chamber comprising a rigid tubular member having spaced resilient diaphragms fixed across the bore thereof to define said chamber, a partition mounted in said chamber and extending across said bore, said partition being formed with orifice means of capillary dimensions, a second chamber associated with one end of said tubular member and defined in part by one of said diaphragms, a third chamber associated with the other end of said tubular member and defined in part by the other of said diaphragms, said second and third chambers being charged with hydraulic liquid under pressure, means for supplying and withdrawing hydraulic liquid to and from one of the last mentioned chambers, the other of said last mentioned chambers being in communication with a hydraulic cushion cell, and means for damping hydraulic flow between said other of said last mentioned chambers and said cushion cell.

4. The unit set forth in claim 3 wherein said first chamber on the side thereof defined by the diaphragm that in part defines said other of said last mentioned chambers is provided with back stop means against which the last mentioned diaphragm is adapted to abut on charging of said other of said last mentioned chambers.

5. A hydro-pneumatic spring unit comprising a first chamber charged with gas under pressure, said chamber comprising a rigid tubular member having spaced resilient diaphragms fixed across the bore thereof to define said chamber, a partition mounted in said chamber and extending across said bore, said partition being formed with orifice means of capillary dimensions, a second chamber associated with one end of said tubular member, said second chamber comprising an outwardly dished rigid member secured to said tubular member adjacent said one end thereof, said dished member and the diaphragm adjacent said one end of said tubular member defining said second chamber, a third chamber associated with the other end of said tubular members, said third chamber comprising an outwardly dished rigid member secured to said tubular member adjacent said other end thereof, the second mentioned dished member and the diaphragm adjacent said other end of said tubular member defining said third chamber, the second mentioned dished member being formed with orifice means, a hydraulic cushion cell in communication with the last mentioned orifice means, said second and third chambers and said cushion cell being charged with hydraulic liquid under pressure, and means for damping hydraulic flow between said cushion cell and said third chamber.

6. The unit set forth in claim 5 wherein said cushion cell is directly connected to said second mentioned dished member by said second mentioned orifice means.

7. The unit set forth in claim 5 wherein said cushion cell is remote from said second mentioned dished member, and wherein conduit means extends between said cushion cell and said second mentioned orifice means.

8. A suspension system for a vehicle seat comprising a rigid support member pivoted adjacent one end thereof for movement about a substantially horizontal axis and carrying the seat adjacent the other end thereof, a hydro-pneumatic unit interposed between the vehicle and the support member between the seat and the pivotal mounting of said support member, said unit comprising a rigid tubular member having spaced resilient diaphragms fixed across the bore thereof to define a first chamber, a partition mounted in said chamber and extending across said bore, said partition being formed with orifice means of capillary dimensions, a second chamber associated with one end of said tubular member, said second chamber comprising an outwardly dished rigid member secured to said tubular member adjacent said one end thereof, said dished member and the diaphragm member adjacent said one end of said tubular member defining said second chamber, a third chamber associated with the other end of said tubular member, said third chamber comprising outwardly dished rigid member secured to said tubular member adjacent said other end thereof, the second mentioned dished member and the diaphragm adjacent said other end of said tubular member defining said third chamber, the second mentioned dished member being formed with orifice means, a hydraulic cushion cell in communication with the last mentioned orifice means, a hydraulic reservoir and pump carried by the vehicle, a hydraulic liquid regulating valve, conduit means extending between said second chamber and said regulating valve, supply conduit means extending between said valve and said pump, and return conduit means extending between said valve and said reservoir.

9. In a hydro-pneumatic spring unit including a gas spring chamber formed in part by one side of a resilient diaphragm, with the other side of the diaphragm forming one side of a hydraulic chamber that is connected to a hydraulic cushion cell, the method of charging the hydraulic chamber and cell which includes partially charging the air spring chamber with gas, pumping sufficient hydraulic liquid into said cushion cell and said hydraulic chamber to deflect said diaphragm into said spring chamber a predetermined amount, releasing hydraulic liquid from said hydraulic chamber and cushion cell until the liquid stream is free from bubbles, again pumping sufficient hydraulic liquid into said hydraulic chamber and said cushion cell to deflect said diaphragm said predetermined amount, withdrawing a predetermined amount of hydraulic liquid from said hydraulic chamber and cushion cell, and further charging said spring chamber with gas to a predetermined pressure.

10. A hydro-pneumatic spring unit comprising means for defining a first compartment and a second compartment, said means including a first diaphragm defining part of the first compartment and a second diaphragm defining part of said second compartment, said compartments being in communication with each other through orifice means of capillary dimensions, and being charged with gas under pressure, housing means together with said first diaphragm defining a first hydraulic liquid receiving chamber, further means together with said second diaphragm defining a second hydraulic liquid receiving chamber, said second chamber being adapted for communication with a hydraulic cushion cell, said first and second chambers being charged with hydraulic liquid, and means for damping hydraulic flow between said second chamber and said cushion cell.

11. A hydro-pneumatic spring unit comprising a first compartment, a second compartment, said compartments being in communication with each other through orifice means of capillary dimensions, each of said compartments being defined in part by diaphragm means, a first hydraulic liquid receiving chamber defined in part by one of said diaphragm means, a second hydraulic liquid receiving chamber defined in part by the other of said diaphragm means, a cushion cell in communication with one of said chambers, said cushion cell and said one chamber being charged with hydraulic liquid, the said compartment that is defined by the diaphragm means of said one chamber forming a gas spring of predetermined volume, when the other of said chambers is charged with sufficient hydraulic liquid to dispose the last mentioned diaphragm means in a predetermined position, independently of the load imposed on the spring unit.

12. A hydro-pneumatic spring unit comprising a first compartment, a second compartment, capillary means for establishing communication between said compartments, each of said compartments being defined in part by diaphragm means, a first hydraulic liquid receiving chamber defined in part by one of said diaphragm means, a second hydraulic liquid receiving chamber defined in part by the other of said diaphragm means, a cushion cell in communication with one of said chambers, said cushion cell and said one chamber being charged with hydraulic liquid and including means for sealing said charge against escape, said compartments being charged with gas and including means for sealing said gas charge against escape, the other chamber being charged with hydraulic liquid, and means for varying the volume of the last mentioned hydraulic liquid charge.

References Cited in the file of this patent

UNITED STATES PATENTS

| | | |
|---|---|---|
| 2,361,575 | Thompson | Oct. 31, 1944 |
| 2,370,942 | Dick | Mar. 6, 1945 |
| 2,489,491 | Johnson | Nov. 29, 1949 |
| 2,805,684 | Love | Sept. 10, 1957 |
| 2,821,239 | Brendel | Jan. 28, 1958 |
| 2,850,276 | Jackson | Sept. 2, 1958 |
| 2,879,829 | Lavoie et al. | Mar. 31, 1959 |